(12) United States Patent
Gu et al.

(10) Patent No.: US 9,470,946 B2
(45) Date of Patent: Oct. 18, 2016

(54) TFT-LCD ARRAY SUBSTRATE PIXEL ELECTRODE CONNECTED TO FIRST AND SECOND CAPACITORS

(71) Applicant: Shanghai Tianma Micro-Electronics Co., Ltd., Shanghai (CN)

(72) Inventors: Hanyu Gu, Shanghai (CN); Dong Qian, Shanghai (CN); Chang-ho Tseng, Shanghai (CN)

(73) Assignee: SHANGHAI TIANMA MICRO-ELECTROINCS CO., LTD., Shanghai (CN)

( * ) Notice: Subject to any disclaimer, the term of this patent is extended or adjusted under 35 U.S.C. 154(b) by 22 days.

(21) Appl. No.: 14/066,630

(22) Filed: Oct. 29, 2013

(65) Prior Publication Data

US 2014/0054592 A1    Feb. 27, 2014

Related U.S. Application Data

(63) Continuation of application No. PCT/CN2012/084264, filed on Nov. 8, 2012.

(30) Foreign Application Priority Data

Jul. 25, 2012    (CN) .......................... 2012 1 0260407

(51) Int. Cl.
*G02F 1/1368* (2006.01)
*G02F 1/1362* (2006.01)
*G02F 1/1343* (2006.01)

(52) U.S. Cl.
CPC ....... *G02F 1/1368* (2013.01); *G02F 1/134363* (2013.01); *G02F 1/136213* (2013.01); *G02F 1/136286* (2013.01); *G02F 2001/13685* (2013.01); *G02F 2201/40* (2013.01)

(58) Field of Classification Search
CPC ........... G02F 1/1368; G02F 1/134363; G02F 1/136213; G02F 1/136286; G02F 2001/13685; G02F 2201/40
See application file for complete search history.

(56) References Cited

U.S. PATENT DOCUMENTS

2008/0094559 A1*  4/2008  Lee .................... G02F 1/136213
                                                          349/143
2008/0246042 A1* 10/2008  Ting ................................ 257/89
2010/0051953 A1*  3/2010  Park ................................ 257/59

(Continued)

FOREIGN PATENT DOCUMENTS

| CN | 1680861 A | 10/2005 |
| CN | 1996594 A | 7/2007 |
| CN | 1996604 A | 7/2007 |

(Continued)

*Primary Examiner* — John P Dulka
*Assistant Examiner* — Charles R Peters
(74) *Attorney, Agent, or Firm* — Alston & Bird LLP

(57) ABSTRACT

A pixel unit at a TFT-LCD array substrate includes a thin film transistor, a first storage capacitor, and a second storage capacitor. The first storage capacitor includes a transparent common electrode, a pixel electrode, and a first insulating layer disposed between the transparent common electrode and the pixel electrode. The second storage capacitor includes a first conductive layer, a second conductive layer, and a second insulating layer disposed between the first and second conductive layers. The first conductive layer is connected to the transparent common electrode within the pixel unit. The second conductive layer is connected to the pixel electrode within the pixel unit.

13 Claims, 9 Drawing Sheets

(56) References Cited

U.S. PATENT DOCUMENTS

2011/0143285 A1* 6/2011 Lim .................. G02F 1/133555
                                                        430/316
2011/0297941 A1* 12/2011 Zhan et al. ..................... 257/59

FOREIGN PATENT DOCUMENTS

| CN | 101989015 A | 7/2009 |
|----|-------------|--------|
| TW | 574540 B    | 9/2013 |

* cited by examiner

TFT-LCD ARRAY SUBSTRATE PIXEL ELECTRODE CONNECTED TO FIRST AND SECOND CAPACITORS

CROSS-REFERENCES TO RELATED APPLICATIONS

This application claims priority to and is a continuation of PCT/CN2012/084264, filed on Nov. 8, 2012 and entitled "TFT-LCD ARRAY SUBSTRATE", which claims the benefit of Chinese Patent Application No. 201210260407.9, filed with the Chinese Patent Office on Jul. 25, 2012 and entitled "TFT-LCD ARRAY SUBSTRATE", the contents of which are incorporated herein by reference in their entirety.

FIELD OF THE INVENTION

The present invention relates to the field of liquid crystal display technologies, in particular to a pixel unit, a Thin Film Transistor Liquid Crystal Display (TFT-LCD) array substrate, and methods for forming the same.

BACKGROUND OF THE INVENTION

Due to its advantages such as low voltage, low power consumption, large amount of display information, and easy colorization, the TFT-LCD is becoming dominant in the current display market, and has been widely used in various electronic devices such as tablet computers, electronic notebooks, mobile phones, digital cameras, navigation devices, and high-definition televisions.

A TFT-LCD includes an array substrate integrated with an opposite color filter substrate, and a liquid crystal layer disposed between the array substrate and the color filter substrate. The basic principle of displaying images with the TFT-LCD is to apply an electric field between the array substrate and the color filter substrate to control the orientation of liquid crystal molecules of the liquid crystal layer, thereby controlling an amount of light penetrating through the liquid crystal molecules of the liquid crystal layer. That is, the amount of light passing through the liquid crystal layer can be controlled with the changes in electric field applied thereto.

The array substrate typically includes a plurality of pixel units formed by intersecting scanning lines with data lines, and a plurality of Thin Film Transistors (TFTs) provided at intersections between the scanning lines and the data lines. Each pixel unit has a pixel electrode, and the TFT is configured as a switching element for turning on or off a voltage applied to the pixel electrode.

When a scan signal is applied to a TFT, the pixel unit controlled by the TFT is activated, and a data signal (i.e., a display signal) is applied to the pixel electrode of the pixel unit. To obtain a high-quality display, the voltage applied to the pixel electrode is required to be maintained at a certain constant value until the next scanning signal. However, since the accumulated charges for maintaining the voltage at the pixel electrode leak out quickly, the voltage at the pixel electrode is reduced prematurely, thus degrading the display quality of the TFT-LCD. Therefore, each pixel unit in the TFT-LCD typically has a storage capacitor to maintain a stable voltage at the pixel electrode of the pixel unit within a predetermined time period.

In the prior art, the storage capacitor is generally formed by a transparent common electrode providing a common voltage, a pixel electrode located above the transparent common electrode, and an insulating layer disposed between the transparent common electrode and the pixel electrode, so that the voltage of the pixel electrode is maintained stable within a predetermined time period by means of the storage capacitor. In order to maintain the stable voltage of the pixel electrode within the predetermined time period, the capacitance of the storage capacitor must be sufficiently large to satisfy a certain capacitance requirement.

In the prior art, the storage capacitor is formed by the transparent common electrode, the pixel electrode located above the transparent common electrode, and the insulating layer disposed between the transparent common electrode and the pixel electrode. If the storage capacitor does not have a specified capacitance value, an additional storage capacitor is generally formed by a metal common electrode, a pixel electrode and an insulating layer disposed between the metal common electrode and the pixel electrode, so that the specified capacitance value can be obtained by the sum of the capacitances of these two storage capacitors.

Specifically, reference may be made to FIGS. 1A and 1B, which are schematic diagrams showing the structures of conventional TFT-LCD array substrates, and the TFT-LCD array substrates are array substrates for an In-Plane Switching (IPS) typed liquid crystal display panel. A Thin Film Transistor (TFT) and a polysilicon layer are not shown in FIGS. 1A and 1B for the sake of clarity. In the TFT-LCD array substrate shown in FIG. 1A, a plan-shaped transparent common electrode 10 and a pixel electrode 11 are provided in a pixel unit 1$a$ and jointly form a parallel electric field to cause the liquid crystal molecules to rotate. A storage capacitor is also formed by the transparent common electrode 10, the pixel electrode 11 located above the transparent common electrode 10, and an insulating layer (not shown in FIG. 1A) disposed between the transparent common electrode 10 and the pixel electrode 11.

In the TFT-LCD array substrate shown in FIG. 1B, a pixel unit 1$b$ is formed with two storage capacitors, that is, a first storage capacitor formed by a transparent common electrode 10, a pixel electrode 11 located above the transparent common electrode 10, and an insulating layer (not shown in FIG. 1B) disposed between the transparent common electrode 10 and the pixel electrode 11; and a second storage capacitor formed by a metal common electrode 12, a pixel electrode 11 located above the metal common electrode 12, and an insulating layer (not shown in FIG. 1B) disposed between the metal common electrode 12 and the pixel electrode 11.

Here, although the capacitance requirement is satisfied by introducing the second storage capacitor in the pixel unit 1$b$, the aperture ratio of the pixel unit 1$b$ is much less than that of the pixel unit 1$a$ due to a light shielding effect of the metal common electrode 12. In particular, the metal common electrode 12 needs to extend across the entire pixel unit 1$b$, in order to connect to the potential of a common voltage outside the pixel unit 1$b$, thus greatly reducing the aperture ratio of the pixel unit 1$b$. Moreover, even though only a portion of the metal common electrode 12 is needed for meeting the capacitance requirement, the size of the metal common electrode 12 cannot be reduced since the metal common electrode 12 needs to be connected to the potential of the common voltage outside the pixel unit 1$b$ (in order to provide a potential necessary for forming the storage capacitor), so that the aperture ratio of the pixel unit 1$b$ cannot be increased.

Considering the design of a 250 PPI pixel unit, for example, which requires a storage capacitor of 180 fF, if the structure of the pixel unit 1 a is used, a capacitance of only 150 fF can typically be obtained (that is, the design requirement for the storage capacitor is not met), while the 250 PPI pixel unit has an aperture ratio of about 79%. On the other hand, if the structure of the pixel unit 1b is used, a capacitance of 180 fF can be obtained (that is, the design requirement for the storage capacitor is met), while the 250 PPI pixel unit has an aperture ratio of merely about 73%. In other words, a high capacitance and a high aperture ratio cannot be obtained simultaneously.

BRIEF SUMMARY OF THE INVENTION

An object of the present invention is to provide a TFT-LCD array substrate that solves the problems of the prior art.

According to an embodiment of the present invention, a TFT-LCD array substrate includes a plurality of pixel units, each of the pixel units may include a thin film transistor, a transparent common electrode, and a pixel electrode disposed on the transparent common electrode. The pixel unit further includes a first storage capacitor, which is formed by the transparent common electrode, the pixel electrode, and a first insulating layer disposed between the transparent common electrode and the pixel electrode. The pixel unit further includes a second storage capacitor, which is formed by a first conductive layer, a second conductive layer, and a second insulating layer disposed between the first conductive layer and the second conductive layer. The first conductive layer is electrically connected within the pixel unit to the transparent common electrode, and the second conductive layer electrically connected within the pixel unit to the pixel electrode.

In an embodiment, in the TFT-LCD array substrate, the pixel unit includes in sequence from bottom to top: a polysilicon layer, a gate insulating layer, a gate electrode, a passivation layer, a data line and a drain electrode metal, an organic film layer, the transparent common electrode, the first insulating layer and the pixel electrode. The polysilicon layer includes a channel, a source electrode, and a drain electrode.

In an embodiment, in the TFT-LCD array substrate, the first conductive layer is in the same layer with the gate electrode, and is connected with the transparent common electrode through a contact hole, the second conductive layer is in the same layer with the drain electrode at the polysilicon layer, and is connected with the drain electrode, and the second insulating layer is the gate insulating layer.

In an embodiment, in the TFT-LCD array substrate, the first conductive layer is in the same layer with the gate electrode, and is connected with the transparent common electrode through a metal conductive pad, the second conductive layer is in the same layer with the drain electrode at the polysilicon layer, and is connected with the drain electrode, and the second insulating layer is the gate insulating layer.

In an embodiment, in the TFT-LCD array substrate, the metal conductive pad, the data line and the drain electrode metal are in the same layer and formed in the same process step. The metal conductive pad has one side connected with the first conductive layer through a first contact hole, and an opposite side connected with the transparent common electrode through a second contact hole.

In an embodiment, in the TFT-LCD array substrate, the first conductive layer and the gate electrode are formed in the same process step, and the second conductive layer and the drain electrode at the polysilicon layer are formed in the same process step.

In an embodiment, in the TFT-LCD array substrate, the first conductive layer is in the same layer with the drain electrode metal, and is connected with the transparent common electrode through a contact hole; the second conductive layer is in the same layer with the gate electrode, and is connected together with the drain electrode metal through a contact hole; and the second insulating layer is the passivation layer.

In an embodiment, in the TFT-LCD array substrate, the first conductive layer and the drain electrode metal are formed in the same process step; and the second conductive layer and the gate electrode are formed in the same process step.

In an embodiment, in the TFT-LCD array substrate, the pixel unit includes, in sequence from bottom to top: a gate electrode, a gate insulating layer, a polysilicon layer, a passivation layer, a data line and a drain electrode metal, an organic film layer, the transparent common electrode, the first insulating layer and the pixel electrode. The polysilicon layer includes a channel, a source electrode, and a drain electrode.

In an embodiment, in the TFT-LCD array substrate, the first conductive layer is in the same layer with the gate electrode, and is connected together with the transparent common electrode through a contact hole; the second conductive layer is in the same layer with the drain electrode, and is connected together with the drain electrode; and the second insulating layer is the gate insulating layer.

In an embodiment, the first conductive layer is in the same layer with the gate electrode, and is connected with the transparent common electrode through a metal conductive pad; the second conductive layer is in the same layer with the drain electrode, and is connected with the drain electrode; and the second insulating layer is the gate insulating layer.

In an embodiment, the first conductive layer and the gate electrode are formed in the same process step; and the second conductive layer and the drain electrode are formed in the same process step.

In the TFT-LCD array substrate provided by the present invention, the capacitance requirement is met by adding a second storage capacitor, which is formed by the first conductive layer, the second conductive layer, and the second insulating layer disposed between the first conductive layer and the second conductive layer. The first conductive layer and the second conductive layer are respectively electrically connected, within the pixel unit, to the transparent common electrode and that of the pixel electrode. In other words, the first conductive layer and the second conductive layer that form the second storage capacitor are not required to extend across the entire pixel unit in order to be connected to the potential outside the pixel unit, but are only required to be electrically connected to the potential of the transparent common electrode and that of the pixel electrode, respectively, inside the pixel unit. Accordingly, under the condition that the capacitance value is met, the size of the first conductive layer and the second conductive layer is reduced, that is, the aperture ratio of the pixel unit is increased, so that the pixel unit can have both a relatively large capacitance and a relatively high aperture ratio.

Embodiments of the present invention also provides a method for manufacturing a TFT-LCD pixel unit. The method includes providing a substrate, forming a first insulating layer on the substrate, forming a polysilicon layer. The polysilicon layer includes a source electrode, a drain electrode, and a channel disposed between the source and drain electrodes. The method also includes forming a second insulating layer on the polysilicon layer, forming a gate electrode and a first conductive layer on the second insulating layer, forming a third insulating layer on the gate electrode and the first conductive layer, and forming a source electrode metal structure and a drain electrode metal structure on the third insulating layer. The method further includes forming an organic film layer on the source and drain electrode metal structures, forming a transparent common electrode on the organic film layer, forming a fourth insulating layer on the transparent common electrode, and forming a pixel electrode on the fourth insulating layer.

In another embodiment, a method for manufacturing a TFT-LCD pixel unit includes providing a substrate, forming a first insulating layer on the substrate, forming a first metal layer on the first insulating layer, the first metal layer comprising a gate electrode and a first conductive layer, forming a second insulating layer on gate electrode and the first conductive layer, and forming a polysilicon layer on the second insulating layer, the polysilicon layer comprising a source electrode, a drain electrode, and a channel disposed between the source and drain electrodes. The method further includes forming a third insulating layer on the polysilicon layer, forming a second metal layer on the third insulating layer, the second metal layer comprising a source electrode metal structure and a drain electrode metal structure, forming an organic film layer on the second metal layer, forming a transparent common electrode on the organic film layer, forming a fourth insulating layer on the transparent common electrode, and forming a pixel electrode on the fourth insulating layer.

DETAILED DESCRIPTION OF THE INVENTION

The TFT-LCD array substrate provided by the present invention will be further described in detail below in conjunction with the accompanying drawings and specific embodiments. Advantages and features of the present invention will become more apparent from the following description and claims. It should be noted that the accompanying drawings are shown in a very simplified form and are not drawn to scale for the purpose of a clear and convenient description of embodiments of the present invention.

It is understood that the use of the terms first, second, etc. does not denote any order, but rather the terms first, second, etc. are used to distinguish one element from another. For example, a first insulating layer may not necessarily be formed before the second insulating layer. Furthermore, the use of the terms a, an, etc. does not denote a limitation of quantity, but rather denote the presence of at least one of the referenced items.

First Embodiment

Figure 2A:
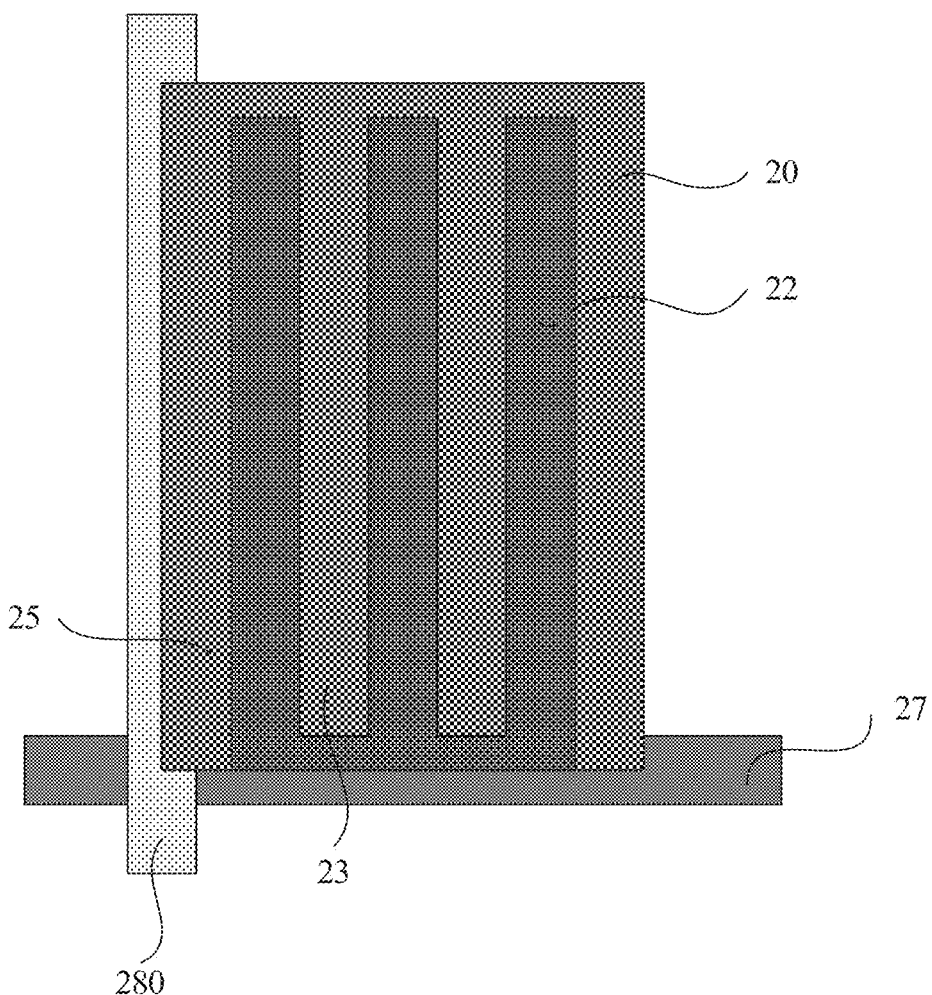
FIG. 2A is a schematic top view of a TFT-LCD array substrate according to a first embodiment of the invention.
Figure 2B:
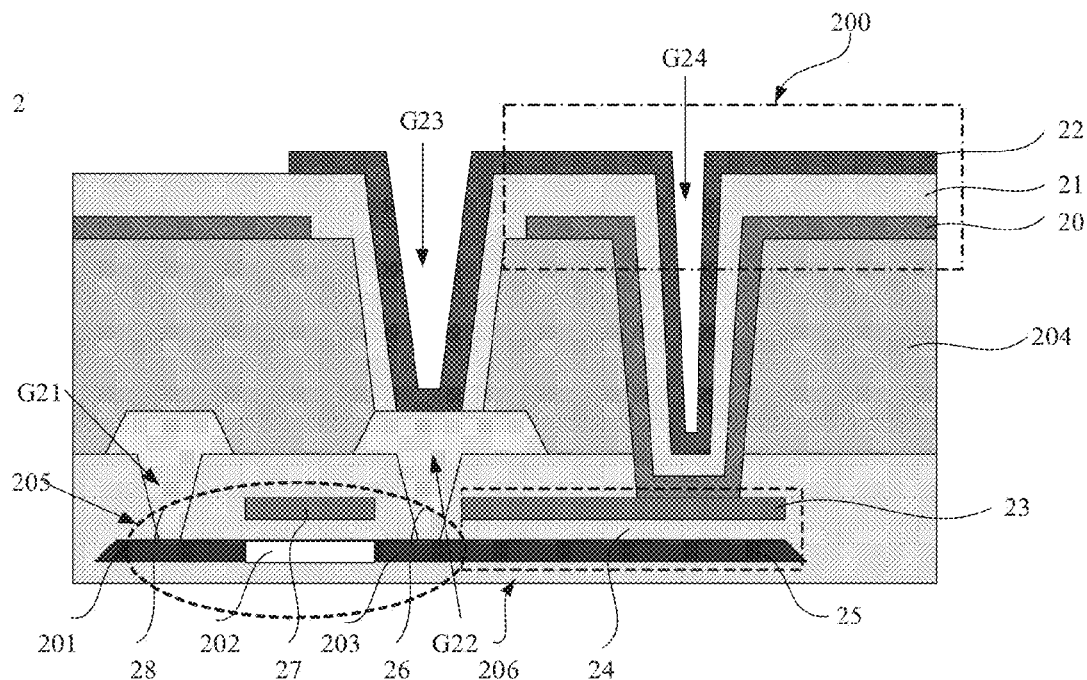
FIG. 2B is a cross-sectional view of the TFT-LCD array substrate according to the first embodiment of the invention.

FIG. 2A is a schematic top view showing the structure of a TFT-LCD array substrate according to the first embodiment of the invention, and FIG. 2B is a schematic diagram showing the cross-sectional structure of the TFT-LCD array substrate according to the first embodiment of the invention. It should be noted that a plurality of pixel units are formed on the TFT-LCD array substrate, but FIGS. 2A and 2B schematically show the structure of only one of the plurality of pixel units in the present embodiment. In addition, for the clarity of the diagram, a contact hole for connecting layers is not shown in FIG. 2A, but the contact hole is clearly shown between the layers according to the schematic sectional diagram in FIG. 2B (that is, the contact hole is needed to be formed in one or more layers to achieve a connection between two layers separated by the one or more layers).

Figure 1A:
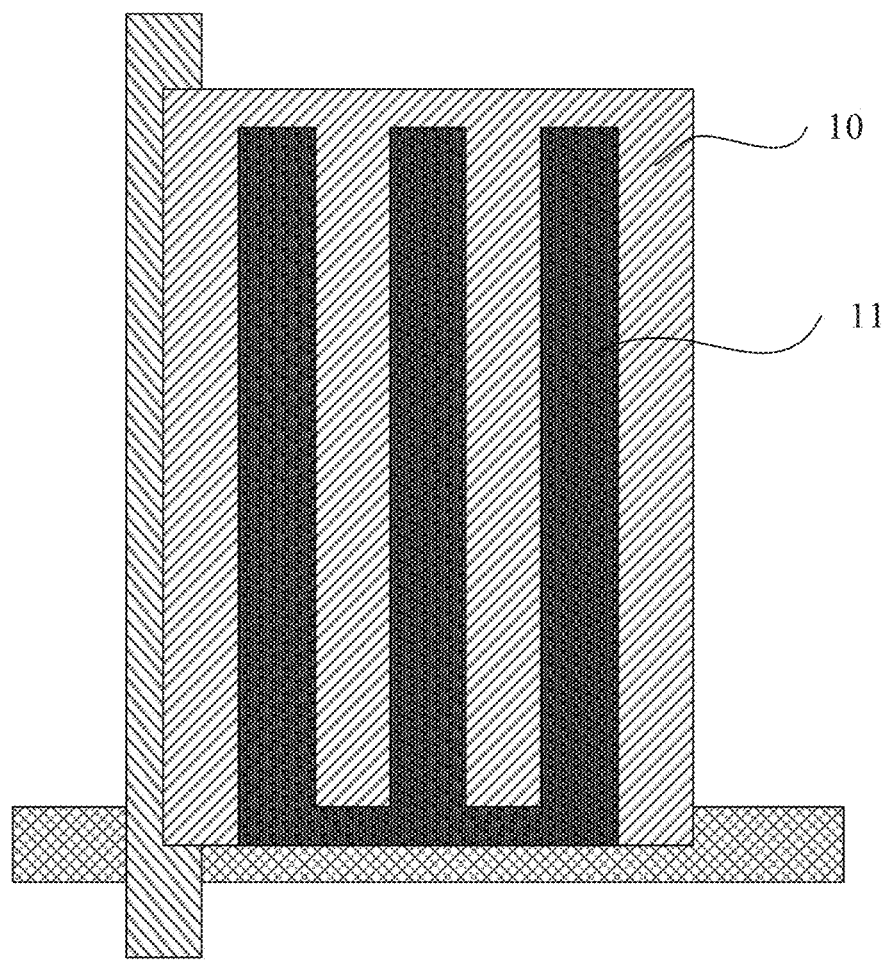
FIGS. 1A and 1B are schematic diagrams showing the structures of conventional TFT-LCD array substrates.
Figure 1B:
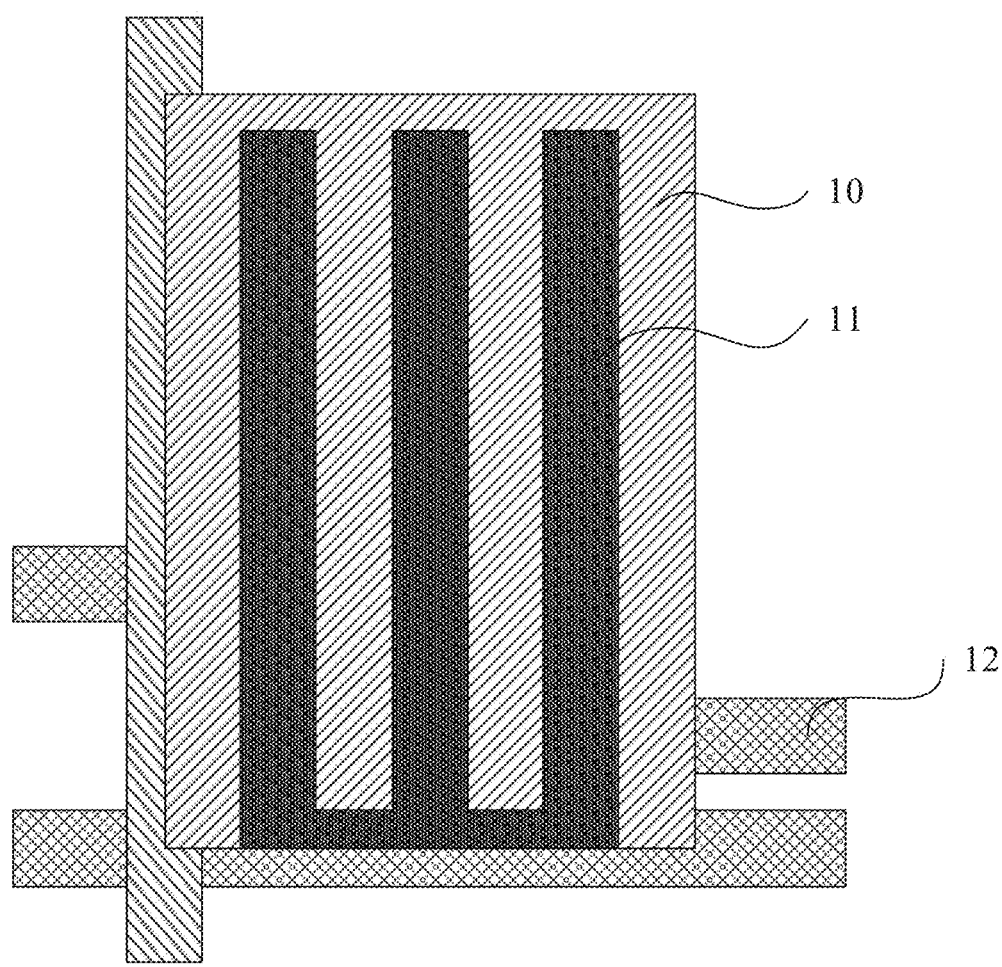

In the invention, a first conductive layer and a second conductive layer, which together form a second storage capacitor, are connected to particular potentials instead of the potentials outside of the pixel unit, to form the storage capacitor. Specifically, as seen from the schematic structural diagram shown in FIG. 2A, a first conductive layer 23 and a second conductive layer 25 are small in size particularly compared with the metal common electrode 12 shown in FIG. 1B, and do not exceed the range of the pixel unit defined by the scan line 27 and the data line 28. Thus, in the introduction of each of the embodiments of the present invention, the implementation of connecting the first and second conductive layers with the particular potentials instead of the potentials outside the pixel unit is emphasized, while the arrangement between the pixel units is a common knowledge in the art and hence is not stressed again herein. In light of the disclosure of the specific internal structure of the pixel unit in the present application, it is possible for those skilled in the art to implement a plurality of the pixel units.

Specifically, as shown in FIGS. 2A and 2B, a pixel unit 2 includes: a thin film transistor 205, a pixel electrode 22, and a transparent common electrode 20, where a parallel electric field may be formed between the pixel electrode 22 and the transparent common electrode 20. Pixel unit 2 also includes a first storage capacitor 200, which is formed by the transparent common electrode 20, the pixel electrode 22 located above the transparent common electrode 20, and a first insulating layer 21 disposed between the transparent common electrode 20 and the pixel electrode 22.

The pixel unit 2 may further include: a second storage capacitor 206, which is formed by a first conductive layer 23, a second conductive layer 25, and a second insulating layer 24 disposed between the first conductive layer 23 and the second conductive layer 25. The first conductive layer 23 and the second conductive layer 25 are electrically connected to the potential of the common electrode 20 and that of the pixel electrode 22 within the pixel unit 2, respectively.

The transparent common electrodes 20 of a plurality of the pixel units 2 are connected with each other and connected to a potential provided by a drive circuit, which is known in the prior art and will not be described herein.

In general, pixel unit 2 includes: a polysilicon layer including a channel 202, a source electrode 201 and a drain electrode 203. The source electrode 201 and the drain electrode 203 of the thin film transistor are formed by an ion implantation process, and the channel 202 between the source electrode 201 and the drain electrode 203 is formed by the undoped portion (i.e., not subjected to the ion implantation process). Pixel unit 2 further includes a gate electrode insulating layer located above the polysilicon layer, a scan line and a gate electrode 27 located above the gate insulating layer, where the gate electrode 27, the source electrode 201, the channel electrode 202, and the drain electrode 203 form a switching element (i.e. a thin film transistor) 205 of the TFT-LCD array substrate, a passivation layer located above the gate electrode 27, and a data line, a source electrode metal structure 28, and a drain electrode metal structure 26 located above the passivation layer. Pixel unit 2 also includes an organic film layer 204 disposed between a layer of the data line and the transparent common electrode 20, and the organic film layer 204 is mainly used for flattening and is relatively thick.

In the present embodiment, for better compatibility with the existing pixel unit structure and its forming method, the first conductive layer 23 as well as the gate electrode 27 and the scan line are in the same layer, and particularly formed by the same process step.

The second conductive layer 25 as well as the source electrode 201 and the drain electrode 203 at the polysilicon layer are in the same layer, and particularly formed by the same process step, which specifically includes: forming the second conductive layer 25, the source electrode 201 and the drain electrode 203 by simultaneously depositing an amorphous silicon layer, simultaneously conducting laser crystallization to form the polysilicon layer, simultaneously etching the polysilicon layer, and simultaneously doping ions to form the second conductive layer 25, the source electrode 201 and the drain electrode 203, at the time, the second conductive layer 25 and the drain electrode 203 being connected together.

The first conductive layer 23 is connected with the transparent common electrode 20 through a fourth contact hole G24 and hence provided with the potential of the common electrode; and the second conductive layer 25 is directly connected with the drain electrode 203 and hence provided with the potential of the pixel electrode. Further, the drain electrode 203 is connected with the pixel electrode 22 through the drain electrode metal 26, and the source electrode 201 is connected with the data line through the source electrode metal 28.

To further embody the structure of the TFT-LCD array substrate, especially the structure of the pixel unit 2 in the present embodiment, the method for forming the TFT-LCD array substrate will be described below.

Figure 6:
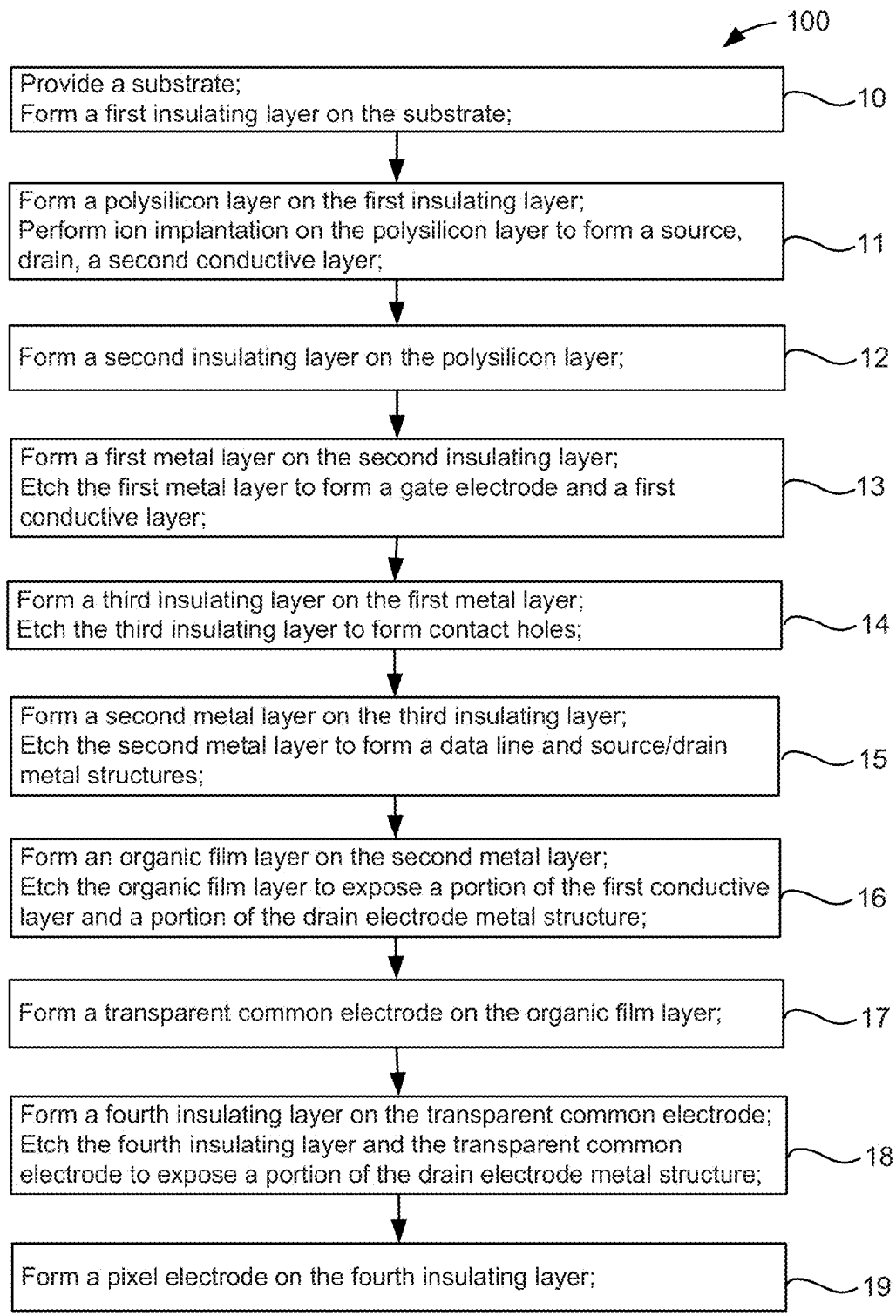
FIG. 6 is a flow chart illustrating a method for manufacturing a pixel unit according to an embodiment of the present invention.

FIG. 6 is a flow chart illustrating a method 100 for manufacturing a pixel unit according to an embodiment of the present invention. For all flowcharts herein, it will be understood that many of the steps can be combined, performed in parallel or performed in a different sequence without affecting the functions achieved. Method 100 includes the following steps.

In step 10, a glass substrate is prepared, an insulating layer (which is herein referred to as an insulating layer A, and in the present embodiment, a plurality of insulating layers are formed in several subsequent steps, and characters "A, B, C . . . " are respectively affixed to the insulating layers formed in sequence, for the purpose of distinction) is formed on the glass substrate. In general, the insulating layer A is made of silicon nitride.

In step 11, a polysilicon layer is formed on the insulating layer, here, photolithography and etching processes are performed on the polysilicon layer to form the channel 202. And then an ion implantation process is also conducted on the polysilicon layer to form the source electrode 201, the drain electrode 203 and the second conductive layer 25, that is, forming the second conductive layer 25 does not require for an additional process step in comparison with the existing process step, so that the manufacturing cost can be reduced. In the present embodiment, the second conductive layer 25 and the drain electrode 203 are connected together.

In step 12, an insulating layer B, i.e., the second insulating layer 24 isolating the second conductive layer 25 from the first conductive layer 23 to be formed subsequently, is formed on the polysilicon layer. In order to be compatible with conventional manufacturing processes for the TFT-LCD array substrate, insulating layer B is also used as an isolation structure (i.e. the gate insulating layer) between the source electrode 201 as well as the drain electrode 203 and a gate electrode 27 to be formed subsequently, that is, in the present embodiment, the second insulating layer 24 is formed by the existing gate insulating layer.

In step 13, a first metal layer is formed on the insulating layer B, and the photolithography and etching processes are conducted on the first metal layer to form the first conductive layer 23. In the present embodiment, the gate electrode 27 and the scan line are formed simultaneously with the first conductive layer 23, that is, forming the first conductive layer 23 does not require an additional process step when compared with the conventional process step, so that the manufacturing cost can be reduced.

In step 14, an insulating layer C, which is used as the isolation structure between the gate electrode 27 as well as the scan line and a data line 28 to be formed subsequently, is formed on the first metal layer, that is, the insulating layer C is the passivation layer of the pixel unit. In general, the insulating layer C is made of silicon oxide or silicon nitride. Here, the photolithography and etching processes are conducted on the passivation layer to form a plurality of contact holes, among which a first contact hole G21 exposes a portion of the source electrode 201 at the polysilicon layer, and a second contact hole G22 exposes a portion of the drain electrode 203 at the polysilicon layer, further, a fourth contact hole G24 exposing a portion of the first conductive layer 23 is formed.

In step 15, a second metal layer is formed on the passivation layer, and photolithography and etching processes are conducted on the second metal layer to form a data line, the source electrode metal structure 28 and the drain electrode metal structure 26. The source electrode metal structure 28 is connected with the data line, and further connected with the source electrode 201 through the first contact hole G21 to transmit a data signal to the source electrode 201. The drain electrode metal structure 26 is connected with the drain electrode 203 at the polysilicon layer through the second contact hole G22.

In step 16, an organic film layer 204 is formed on the second metal layer, and the photolithography and etching processes are conducted on the organic film layer 204 to expose fourth contact hole G24, so that a portion of the first conductive layer 23 is exposed; and further the third contact hole G23 exposing a portion of the drain electrode metal structure 26 is formed.

In step 17, a transparent common electrode 20 is formed on the organic film layer 24, and connected with the first conductive layer 23 through the fourth contact hole G24.

In step 18, an insulating layer D, i.e., first insulating layer 21 for isolating the transparent common electrode 20 from the pixel electrode 22 to be formed subsequently, is formed on the transparent common electrode 20, and the photolithography and etching processes are conducted on the insulating layer D to exposes the third contact hole G23, so that a portion of the drain electrode metal structure 26 is exposed.

In step 19, the pixel electrode 22, which is connected with the drain electrode metal 26 through the third contact hole G23, is formed on the first insulating layer 21.

The first storage capacitor 200 and the second storage capacitor 206 are thus formed by the above process steps. The second storage capacitor 206 is formed by the first conductive layer 23, the second conductive layer 25, and the second insulating layer 24 disposed between the first conductive layer 23 and the second conductive layer 25. The first conductive layer 23 and the second conductive layer 25 are electrically connected, within the pixel unit 2, to the potential of the transparent common electrode 20 and that of the pixel electrode 22, respectively.

Here, the first conductive layer 23 and the second conductive layer 25 are electrically connected, within the pixel unit 2, to the potential of the transparent common electrode 20 and that of the pixel electrode 22, respectively, so that the first conductive layer 23 and the second conductive layer 25, which together form the second storage capacitor 206, do not extend across the entire pixel unit 2 in order to be connected to the potential outside the pixel unit 2, but to respectively electrically connect, inside the pixel unit 2, to the potential of the transparent common electrode 20 and that of the pixel electrode 22. Therefore, under the condition that the capacitance is satisfying, the sizes of the first conductive layer 23 and the second conductive layer 25 are reduced, that is, the aperture ratio of the pixel unit 2 is increased, thus implementing the pixel unit 2 having a large capacitance and a high aperture ratio.

Here, to further illustrate benefits and advantages of both a relatively large capacitance and a relatively high aperture ratio achieved by the TFT-LCD array substrate provided in the embodiment of the present invention, for example, the design of 250 PPI pixel units each having a length of 102 μm and a width of 34 μm was considered by the inventor, and an aperture ratio up to 77% was measured given that the requirement for a capacitance of 180 fF is met. Although the aperture ratio up to 77% is slightly decreased when compared with the case that only the first storage capacitor is present (e.g., 79%), the aperture ratio of the pixel unit provided by the present embodiment has been significantly improved considering that the capacitance requirement is satisfied. Since the first conductive layer 23 or the second conductive layer 25 does not extend across the entire pixel unit 2 in the present embodiment, the area of the first conductive layer 23 and the second conductive layer 25 can be reduced. Therefore, the pixel unit provided the present embodiment has the benefits and advantages of both a relatively large capacitance and a relatively high aperture ratio when compared with the conventional solutions.

Second Embodiment

Figure 3:
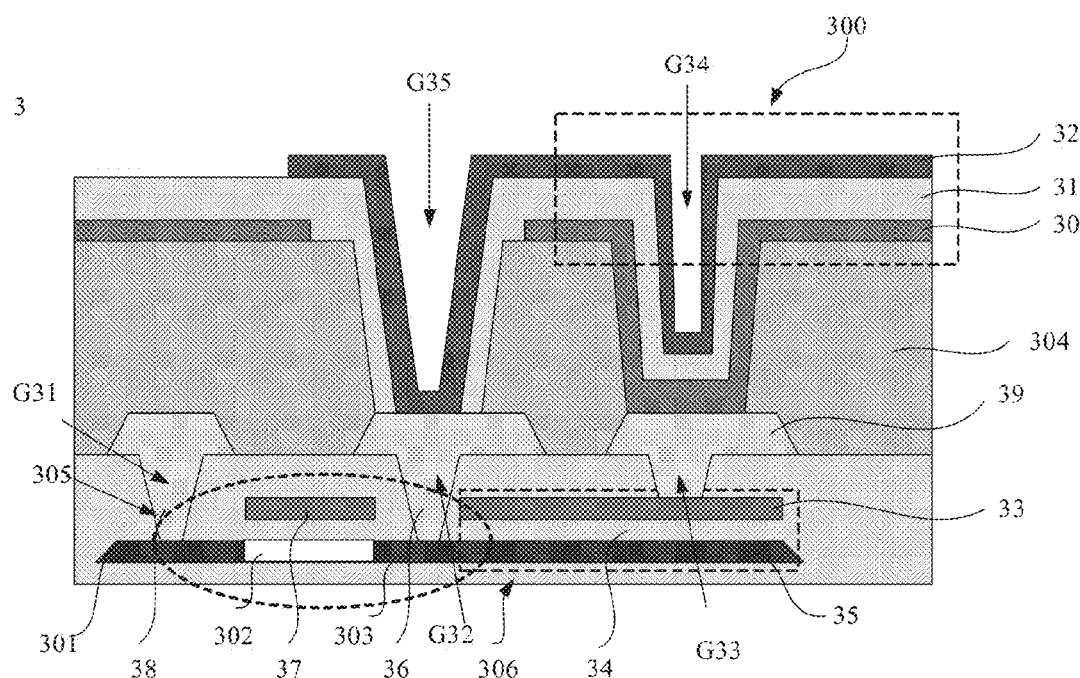
FIG. 3 is a cross-sectional view of a TFT-LCD array substrate according to a second embodiment of the invention.

FIG. 3 is a schematic cross-sectional view of a TFT-LCD array substrate according to the second embodiment of the present invention. As shown in FIG. 3, a plurality of pixel units are formed on the TFT-LCD array substrate, and each pixel unit 3 includes: a thin film transistor switch 305 (not shown in FIG. 3), a pixel electrode 32, and a transparent common electrode 30. A parallel electric field may be formed between the pixel electrode 32 and the transparent common electrode 30. Pixel unit 3 also includes a first storage capacitor 300, which is formed by the transparent common electrode 30, the pixel electrode 32 located above the transparent common electrode 30, and a first insulating layer 31 disposed between the transparent common electrode 30 and the pixel electrode 32.

The pixel unit 3 further includes: a second storage capacitor 306, which is formed by a first conductive layer 33, a second conductive layer 35, and a second insulating layer 34 disposed between the first conductive layer 33 and the second conductive layer 35, where, the first conductive layer 33 and the second conductive layer 35 are respectively electrically connected, inside the pixel unit 3, to the potential of the transparent common electrode 30 and that of the pixel electrode 32.

A difference between the second embodiment and the first embodiment lies in that the first conductive layer 33 is not directly connected with the transparent common electrode 30 through a contact hole, but is connected with the transparent common electrode 30 through a metal conductive pad 39. Specifically, the first conductive layer 33 is connected with one side of metal conductive pad 39 through a third contact hole G33, while the opposite side of the metal conductive pad 39 is connected with the transparent common electrode 30 through a fourth contact hole G34, so that the first conductive layer 33 is electrically connected with the transparent common electrode 30.

In comparison with the first embodiment, both the third contact hole G33 and the fourth contact hole G34 required for connecting the first conductive layer 33 with the transparent common electrode 30 are shallow in the second embodiment, thereby ensuring the reliability of the formed contact holes, and hence ensuring the reliability of the TFT-LCD array substrate.

Figure 7:
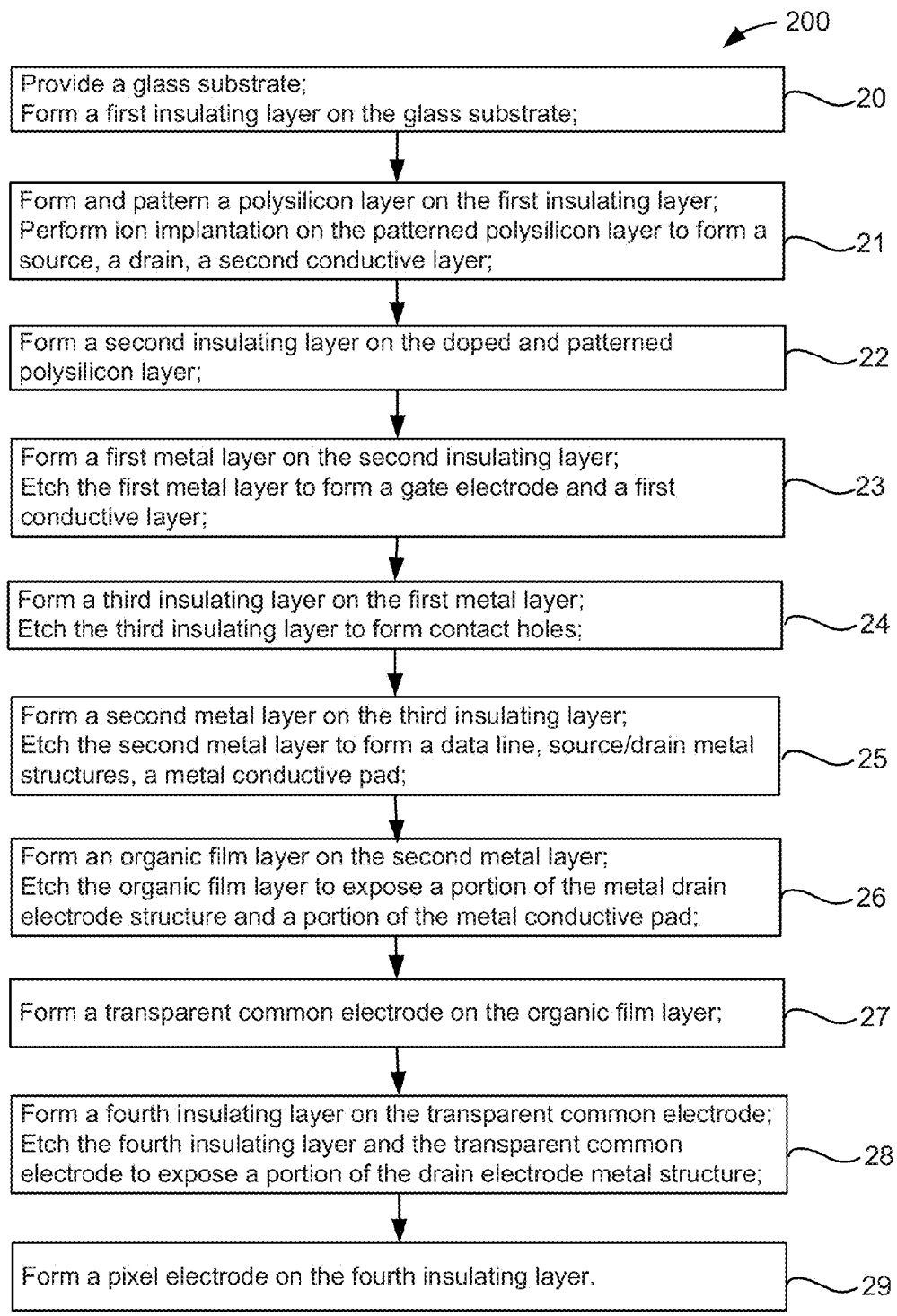
FIG. 7 is a flow chart illustrating another method for manufacturing a pixel unit according to an embodiment of the present invention.
Figure 8:
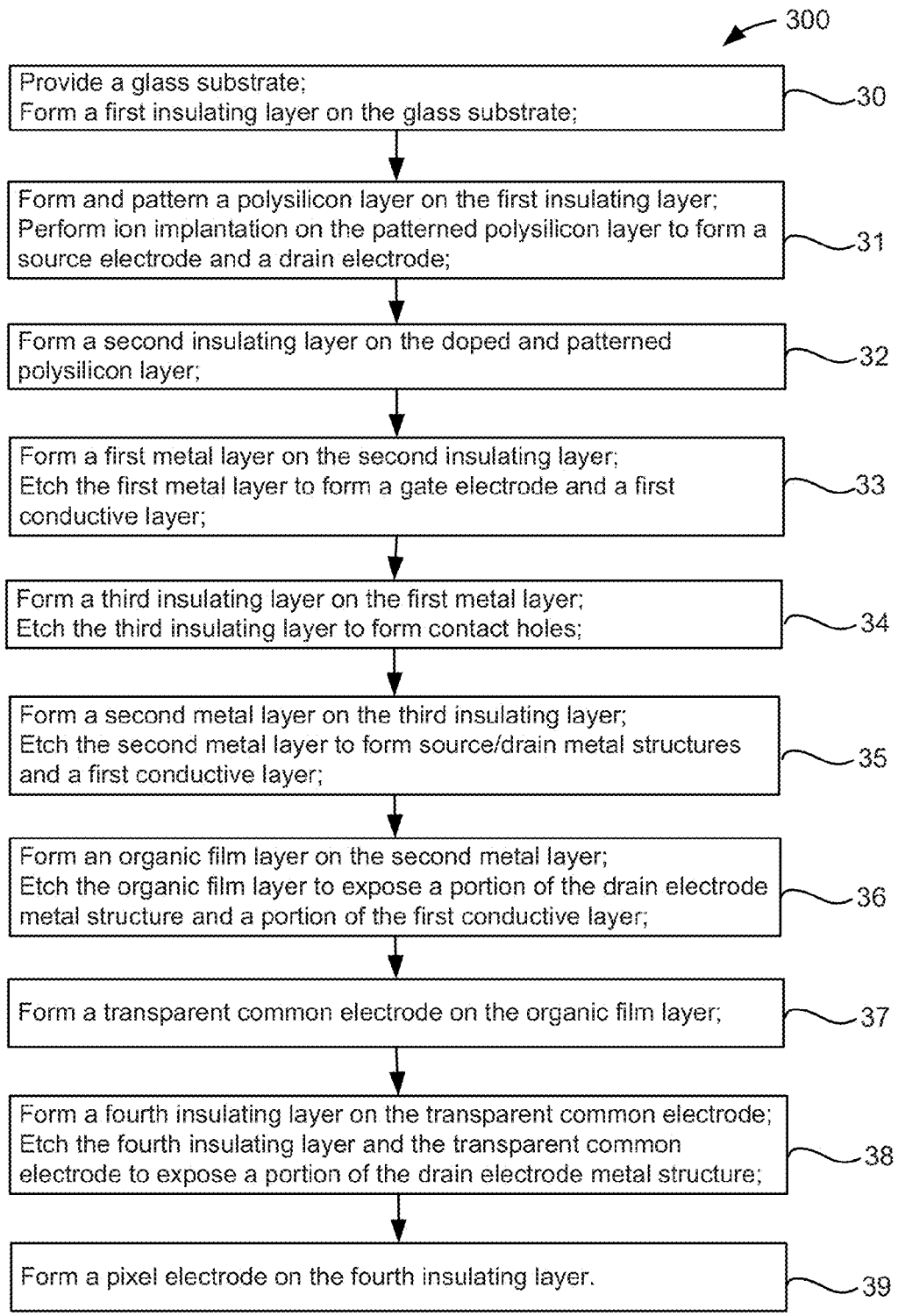
FIG. 8 is a flow chart illustrating yet another method for manufacturing a pixel unit according to an embodiment of the present invention.

To further embody the structure of the TFT-LCD array substrate, especially the structure of the pixel unit 3 in the present embodiment, the method for forming the TFT-LCD array substrate will be described below. Specifically, in the present embodiment, the TFT-LCD array substrate is implemented through the following process steps from 20 to 29 as shown in FIG. 7.

In step 20, a glass substrate is prepared, an insulating layer (which is herein referred to as an insulating layer A, and in the present embodiment, a plurality of insulating layers are formed in several steps, and characters "A, B, C . . . " are respectively affixed to the insulating layers formed in sequence, for the purpose of distinction) is formed on the glass substrate. In general, the insulating layer A is made of silicon nitride.

In the step 21, a polysilicon layer is formed on the insulating layer, here, photolithography and etching processes are performed on the polysilicon layer to form the channel 302, and then an ion implantation process is also conducted on the polysilicon layer to form the source electrode 301, the drain electrode 303 and the second conductive layer 35, that is, forming the second conductive layer 35 does not require for an additional process step in comparison with the existing process step, so that the manufacturing cost can be reduced. In the present embodiment, the second conductive layer 35 and the drain electrode 303 are connected together.

In step 22, an insulating layer B, i.e., the second insulating layer 34 isolating the second conductive layer 35 from the first conductive layer 33 to be formed subsequently, is formed on the polysilicon layer. In order to be compatible with the conventional manufacturing processes for the TFT-LCD array substrate, the insulating layer B is also used as an isolation structure (i.e. the gate insulating layer) between the source electrode 301 as well as the drain electrode 303 and a gate electrode 37 to be formed subsequently, that is, in the present embodiment, the second insulating layer 34 is formed by the existing gate insulating layer.

In step 23, a first metal layer is formed on the insulating layer B, and the photolithography and etching processes are conducted on the first metal layer to form the first conductive layer 33. In the present embodiment, the gate electrode 37 and the scan line are formed simultaneously with the first conductive layer 33. In other words, forming the first conductive layer 33 does not require an additional process step when compared with the existing process step, so that the manufacturing cost can be reduced.

In step 24, a passivation layer (i.e., an insulating layer C), which is used as the isolation structure between the gate electrode 37 as well as the scan line and a layer of a data line to be formed subsequently, is formed on the first metal layer. In general, the passivation layer is made of silicon oxide or silicon nitride. Here, the photolithography and etching processes are conducted on the passivation layer to form a plurality of contact holes, among which a first contact hole G31 exposes a portion of the source electrode 301 at the polysilicon layer, and a second contact hole G32 exposes a portion of the drain electrode 303 at the polysilicon layer, and a third contact hole G33 exposes a portion of the first conductive layer 33.

In step 25, a second metal layer is formed on the passivation layer, and photolithography and etching processes are conducted on the second metal layer to form the data line, the source electrode metal structure 38, the drain electrode metal structure 36 and a metal conductive pad 39. The source electrode metal structure 38 is connected with the data line, and further connected with the source electrode 301 through the first contact hole G31. The drain electrode metal structure 36 is connected with the drain electrode 303 at the polysilicon layer through the second contact hole G32; the metal conductive pad 39 is connected with the first conductive layer 33 through the third contact hole G33.

In step 26, an organic film layer 304 is formed on the second metal layer, and the photolithography and etching processes are conducted on the organic film layer 304 to form the fourth contact hole G34, so that the metal conductive pad 39 is exposed; and further a fifth contact hole G35 exposing a portion of the drain electrode metal structure 36 is formed.

In step 27, a transparent common electrode 30 is formed on the organic film layer 304, and connected with the metal conductive pad 39 through the fourth contact hole G34 formed in the step 26, that is, the first conductive layer 33 is electrically connected with the transparent common electrode 30.

In step 28, an insulating layer D, i.e., the first insulating layer 31 for isolating the transparent common electrode 30 from the pixel electrode 32 to be formed subsequently, is formed on the transparent common electrode 30, and the photolithography and etching processes are conducted on the insulating layer D to exposes the fifth contact hole G35, so that a portion of the drain electrode metal structure 36 is exposed.

In step 29, the pixel electrode 32, which is connected with the drain electrode metal structure 36 through the fifth contact hole G35, is formed on the first insulating layer 31, so that the second conductive layer 35 is connected with the pixel electrode 32.

The first storage capacitor 300 and the second storage capacitor 306 are thus formed by the above process steps, where the second storage capacitor 306 is formed by the first conductive layer 33, the second conductive layer 35, and the second insulating layer 34 disposed between the first conductive layer 33 and the second conductive layer 35; and the first conductive layer 33 and the second conductive layer 35 are respectively electrically connected, inside the pixel unit 3, to the potential of the transparent common electrode 30 and that of the pixel electrode 32.

Third Embodiment

Figure 4:
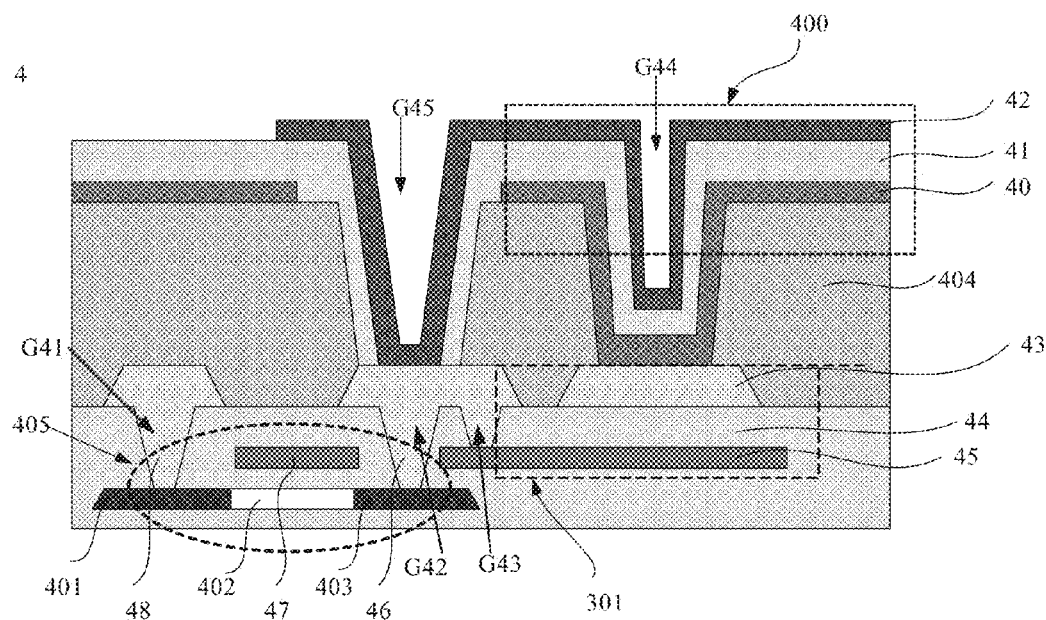
FIG. 4 is a cross-sectional view of a TFT-LCD array substrate according to a third embodiment of the invention.

FIG. 4, which is a schematic cross-sectional view of a TFT-LCD array substrate according to the third embodiment of the present invention. As shown in FIG. 4, each pixel unit 4 includes: a thin film transistor switch 405, a pixel electrode 42, and a transparent common electrode 40, where a parallel electric field may be formed between the pixel electrode 42 and the transparent common electrode 40. Pixel unit 4 also includes a first storage capacitor 400, which is formed by the transparent common electrode 40, the pixel electrode 42 located above the transparent common electrode 40, and a first insulating layer 41 disposed between the transparent common electrode 40 and the pixel electrode 42.

The pixel unit 4 further includes: a second storage capacitor 406, which is formed by a first conductive layer 43, a second conductive layer 45, and a second insulating layer 44 disposed between the first conductive layer 43 and the second conductive layer 45, where, the first conductive layer 43 and the second conductive layer 45 are respectively electrically connected, inside the pixel unit 4, to the potential of the transparent common electrode 40 and that of the pixel electrode 42.

A difference between the third embodiment and the first embodiment lies in that in the third embodiment, the first conductive layer 43 and a drain electrode metal 46 are in the same layer, and the first conductive layer 43 is connected with the transparent common electrode 40 through a fourth contact hole G44 and hence provided with the potential of the common electrode. The second conductive layer 45 as well as a gate electrode 47 and a scan line are in the same layer, and the second conductive layer 45 is connected with the drain electrode metal structure 46 through a third contact hole G43 and hence provided with the potential of the pixel electrode. The second insulating layer 44 is a passivation layer.

A method to embody the structure of pixel unit 4 formed at a TFT-LCD array substrate, may be implemented through the following process steps from 30 to 39.

In step 30, a glass substrate is prepared, an insulating layer (which is herein referred to as an insulating layer A, and in the present embodiment, a plurality of insulating layers are formed in several steps, and characters "A, B, C . . . " are respectively affixed to the insulating layers formed in sequence, for the purpose of distinction) is formed on the glass substrate. In general, the insulating layer A is made of silicon nitride.

In step 31, a polysilicon layer is formed on the insulating layer A, here, photolithography and etching processes are performed on the polysilicon layer to form the channel 402, and then an ion implantation process is also conducted on the polysilicon layer to form the source electrode 401 and the drain electrode 403.

In step 32, an insulating layer B, which is used as an isolation structure (i.e. the gate insulating layer) between the source electrode 401 as well as the drain electrode 403 and a gate electrode 47 to be formed subsequently, is formed on the polysilicon layer.

In the step 33, a first metal layer is formed on the insulating layer B, and the photolithography and etching processes are conducted on the first metal layer to form the second conductive layer 45; in the present embodiment, the gate electrode 47 and the scan line are formed simultaneously with the second conductive layer 45, that is, forming the second conductive layer 45 does not require an additional process step when compared with conventional processes, so that manufacturing costs can be reduced.

In step 34, a passivation layer (i.e. an insulating layer C), which is used as the isolation structure between the gate electrode 47 as well as the scan line and a data line 48 to be formed subsequently, is formed on the first metal layer. In general, the passivation layer is made of silicon oxide or silicon nitride. Further, the passivation layer is the second insulating layer 44 isolating the second conductive layer 45 from a first conductive layer 43 to be formed subsequently. Here, the photolithography and etching processes are conducted on the passivation layer to form a plurality of contact holes, among which a first contact hole G41 exposes a portion of the source electrode 401, and a second contact hole G42 exposes a portion of the drain electrode 403, and a third contact hole G43 exposes a portion of the second conductive layer 45.

In step 35, a second metal layer is formed on the passivation layer, and photolithography and etching processes are conducted on the second metal layer to form the source electrode metal structure 48, the drain electrode metal 46 and the first conductive layer 43. The source electrode metal structure 48 is connected with the data line, and further connected with the source electrode 401 through the first contact hole G41. The drain electrode metal structure 46 is connected with the drain electrode 403 through the second contact hole G42; and further the drain electrode metal 46 is connected with the second conductive layer 45 through the third contact hole G43, and hence the second conductive layer 45 is provided with the potential of the pixel electrode.

In step 36, an organic film layer 404 is formed on the second metal layer, and the photolithography and etching processes are conducted on the organic film layer 404 to form the fourth contact hole G44, so that the first conductive layer 43 is exposed; and further a fifth contact hole G45 exposing a portion of the drain electrode metal structure 46 is formed.

In step 37, a transparent common electrode 40 is formed on the organic film layer 404, and connected with the first conductive layer 43 through the fourth contact hole G44 formed in the step 36, and hence the first conductive layer 43 is provided with the potential of the common electrode.

In step 38, an insulating layer D, i.e. the first insulating layer 41 for isolating the transparent common electrode 40 from the pixel electrode 42 to be formed subsequently, is formed on the transparent common electrode 40, and the photolithography and etching processes are conducted on the insulating layer D to expose the fifth contact hole G45, so that the drain electrode metal structure 46 is exposed.

In step 39, the pixel electrode 42, which is connected with the drain electrode metal 46 through the fifth contact hole G45, is formed on the first insulating layer 41.

The first storage capacitor 400 and the second storage capacitor 406 are thus formed by the above process steps, where the second storage capacitor 406 is formed by the first conductive layer 43, the second conductive layer 45, and the second insulating layer 44 disposed between the first conductive layer 43 and the second conductive layer 45. The first conductive layer 43 and the second conductive layer 45 are electrically connected, within the pixel unit 4, to the potential of the transparent common electrode 40 and that of the pixel electrode 42, respectively.

In the third embodiment of the present invention, since the first conductive layer 43 is formed on the second metal layer, the distance between the first conductive layer and the transparent common electrode 40 is reduced, so that the contact hole for connecting the first conductive layer 43 with the transparent common electrode 40 can be shallow, thereby ensuring the reliability of the contact holes, and hence ensuring the reliability of the TFT-LCD array substrate.

Fourth Embodiment

Figure 5:
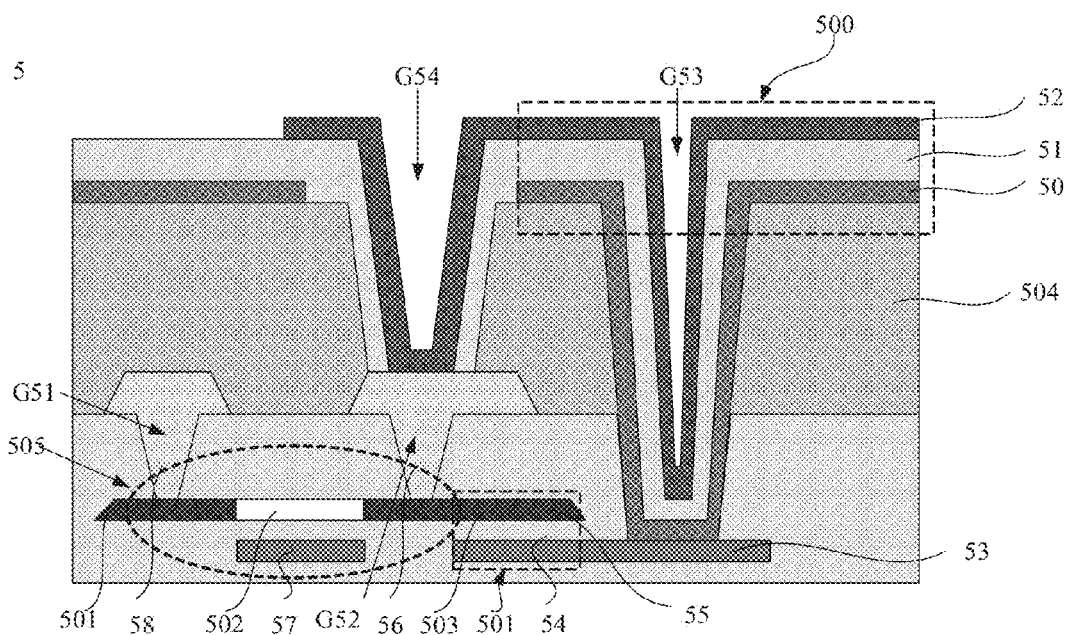
FIG. 5 is a cross-sectional view of a TFT-LCD array substrate according to a fourth embodiment of the invention.

FIG. 5 is a schematic cross-sectional view of a TFT-LCD array substrate according to the fourth embodiment. As shown in FIG. 5, each pixel unit 5 includes: a thin film transistor switch 505 (not shown in FIG. 5), a pixel electrode 52, and a transparent common electrode 50, where a parallel electric field may be formed between the pixel electrode 52 and the transparent common electrode 50. Pixel unit 5 also includes a first storage capacitor 500, which is formed by the transparent common electrode 50, the pixel electrode 52 located above the transparent common electrode 50, and a first insulating layer 51 disposed between the transparent common electrode 50 and the pixel electrode 52.

The pixel unit 5 further includes: a second storage capacitor 506, which is formed by a first conductive layer 53, a second conductive layer 55, and a second insulating layer 54 disposed between the first conductive layer 53 and the second conductive layer 55, where, the first conductive layer 53 and the second conductive layer 55 are respectively electrically connected, inside the pixel unit 5, to the potential of the transparent common electrode 50 and that of the pixel electrode 52.

A difference between the fourth embodiment and the first embodiment lies in that the gate structure in the fourth embodiment is a top-gate electrode structure, and the gate electrode structure in the first embodiment (also in the second and third embodiments) is a bottom-gate electrode structure. As can be seen, the structure of the gate electrode can be positioned in a number of ways in the TFT substrate array provided by the present invention. According to embodiments of the present invention, the gate electrode can be a top-gate electrode structure or a bottom-gate electrode structure.

Figure 9:
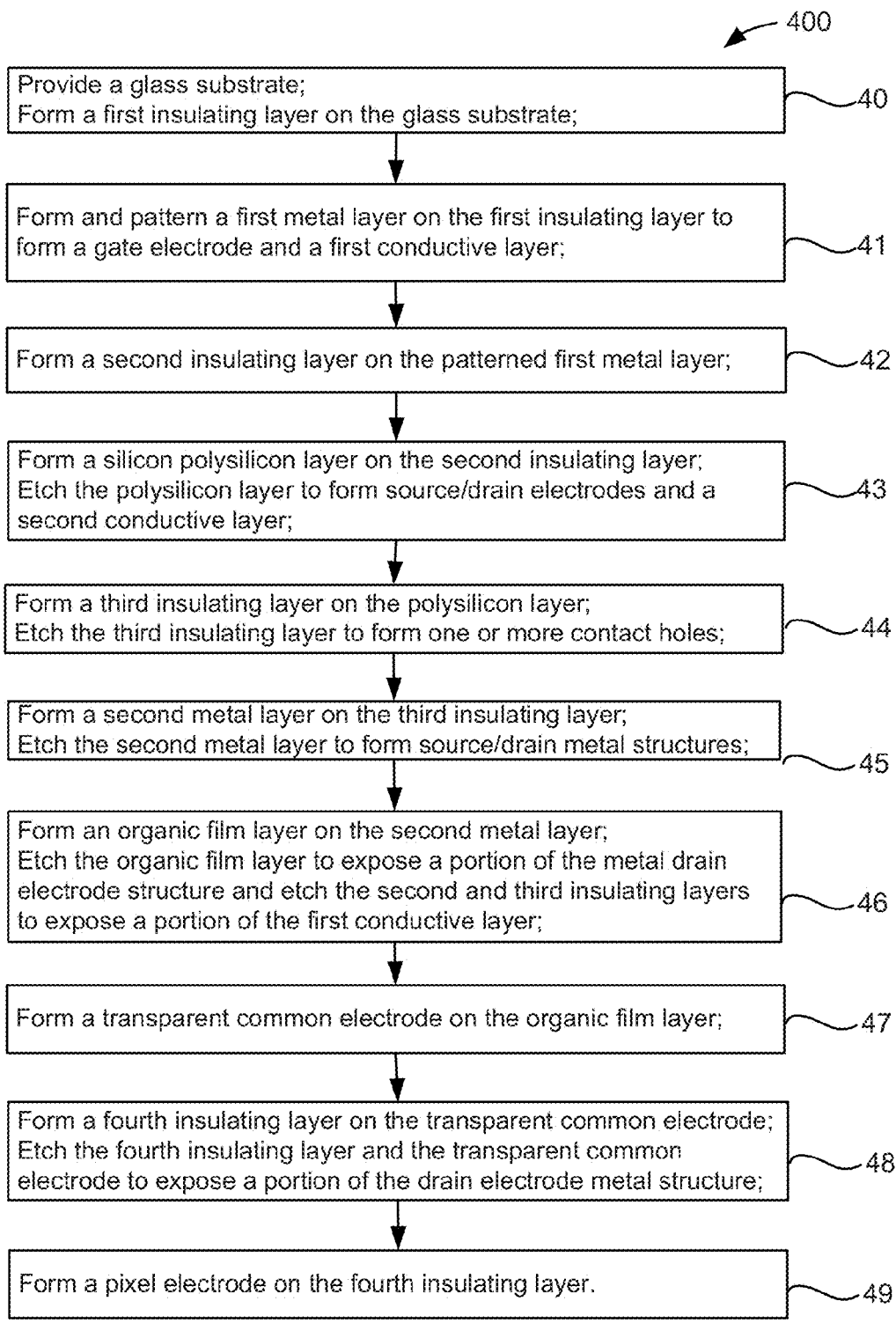
FIG. 9 is a flow chart illustrating yet another method for manufacturing a pixel unit according to an embodiment of the present invention.

FIG. 9 is a flow chart illustrating yet another method 400 for manufacturing a pixel unit according to an embodiment of the present invention. Method 400 includes the following steps.

In step 40, a glass substrate is prepared, an insulating layer (which is herein referred to as an insulating layer A, and in the present embodiment, a plurality of insulating layers are formed in several steps, and characters "A, B, C . . . " are respectively affixed to the insulating layers formed in sequence, for the purpose of distinction) is formed on the glass substrate. In general, the insulating layer A is made of silicon nitride.

In step 41, a first metal layer is formed on the insulating layer, here, photolithography and etching processes are performed on the first metal layer to form the first conductive layer 53; in the present embodiment, a gate electrode 57 and a scan line are formed simultaneously with the first conductive layer 53, that is, forming the first conductive layer 53 does not require for an additional process step in comparison with the existing process step, so that the manufacturing cost can be reduced.

In step 42, an insulating layer B (i.e. the gate insulating layer), which is used as the isolation structure between the gate electrode 57 as well as the scan line and a source electrode 501 as well as a drain electrode 503 to be formed subsequently, is formed on the first metal layer.

In step 43, a polysilicon layer is formed on the insulating layer B, and the photolithography and etching processes are conducted on the polysilicon layer to form the channel 502; and then an ion implantation process is also conducted on the polysilicon layer to form the source electrode 501, the drain electrode 503 and the second conductive layer 55, that is, forming the second conductive layer 55 does not require for an additional process step in comparison with the existing process step, so that the manufacturing cost can be reduced. In the present embodiment, the second conductive layer 55 and the drain electrode 503 are connected together, and hence the second conductive layer 55 is provided with the potential of the pixel electrode.

In step 44, a passivation layer (i.e. an insulating layer C) is formed on the polysilicon layer. In general, the passivation layer is made of silicon oxide or silicon nitride. Here, the photolithography and etching processes are conducted on the passivation layer to form a plurality of contact holes, among which a first contact hole G51 exposes the source electrode 501 at the polysilicon layer, and a second contact hole G52 exposes the drain electrode 503 at the polysilicon layer, and a third contact hole G53 exposes a portion of the first conductive layer 53.

In step 45, a second metal layer is formed on the passivation layer, and photolithography and etching processes are conducted on the second metal layer to form the data line, the source electrode metal 58 and the drain electrode metal 56. The source electrode metal 58 is connected with the connected with the source electrode 501 through the first contact hole G51; the drain electrode metal 56 is connected with the drain electrode 503 at the polysilicon layer through the second contact hole G52.

In step 46, an organic film layer 504 is formed on the second metal layer, and the photolithography and etching processes are conducted on the organic film layer 504 to form the third contact hole G53, so that the first conductive layer 53 is exposed; and further a fourth contact hole G54 exposing the drain electrode metal 56 is formed.

In step 47, a transparent common electrode 50 is formed on the organic film layer, and connected with the first conductive layer 53 through the third contact hole G53.

In step 48, an insulating layer D, i.e. the first insulating layer 51 for isolating the transparent common electrode 50 from the pixel electrode 52 to be formed subsequently, is formed on the transparent common electrode 50, and the photolithography and etching processes are conducted on the insulating layer D to expose the fourth contact hole G54, so that the drain electrode metal 56 is exposed.

In step 49, the pixel electrode 52, which is connected with the drain electrode metal 56 through the fourth contact hole G54, is formed on the first insulating layer 51.

The first storage capacitor 500 and the second storage capacitor 506 are thus formed by the above process steps, where the second storage capacitor 506 is formed by the first conductive layer 53, the second conductive layer 55, and the second insulating layer 54 disposed between the first conductive layer 53 and the second conductive layer 55; and the first conductive layer 53 and the second conductive layer 55 are respectively electrically connected, inside the pixel unit 5, to the potential of the transparent common electrode 50 and that of the pixel electrode 52.

Likewise, in the structure of the TFT having the bottom-gate electrode structure, a metal conductive pad, which is in the same layer with the data line, may also be provided to electrically connect the first conductive layer 53 with the transparent common electrode 50, as described in the third embodiment. Particularly, for example, a portion of the first conductive layer 53 is exposed by a contact hole provided in the passivation layer; then a metal in the same layer with the data line is used as the metal conductive pad, which is connected with the first conductive layer 53 through the contact hole; and then another contact hole, through which the transparent common electrode 50 is connected with the metal conductive pad, is provided in the organic film layer 504, thereby connecting the first conductive layer 53 with the transparent common electrode 50. With such structure, the depth of the contact hole for connecting the first conductive layer 53 with the transparent common electrode 50 may be reduced, thereby improving the reliability of the process, which will not be described again therein, and reference may be made to the third and fourth embodiments specifically.

While the advantages and embodiments of the present invention have been depicted and described, there are many more possible embodiments, applications and advantages without deviating from the spirit of the inventive ideas described herein. For example, the metal layer for forming the gate electrode is disposed closer to the substrate than the silicon polysilicon layer in an embodiment. In another embodiment, the gate electrode and the scan line are formed concurrently (simultaneously) with the first conductive layer. It will be apparent to those skilled in the art that many modifications and variations in construction and widely differing embodiments and applications of the present invention will suggest themselves without departing from the spirit and scope of the invention.

What is claimed is:

1. A pixel unit of an IPS type TFT-LCD array substrate having a plurality of pixel units, the pixel unit comprising:
    a thin film transistor switch, a pixel electrode, and a transparent common electrode, so that a parallel electric field is formed between the pixel electrode and the transparent common electrode; wherein the transparent common electrode is located between the pixel electrode and a substrate;
    a first storage capacitor being formed by the transparent common electrode, the pixel electrode, and a first insulating layer disposed between the transparent common electrode and the pixel electrode; and
    a second storage capacitor being formed by a first conductive layer, a second conductive layer, and a second insulating layer disposed between the first conductive layer and the second conductive layer;
    wherein the first conductive layer is electrically connected within the pixel unit to the transparent common electrode and the second conductive layer is electrically connected within the pixel unit to the pixel electrode, so that a common electrode potential is provided to the first conductive layer or the second conductive layer by the transparent common electrode connected thereto; wherein the first conductive layer and the transparent common electrode are formed in different layers, and wherein the second conductive layer and the pixel electrode are formed in different layers.

2. The pixel unit of claim 1, further comprising in sequence from bottom to top:

a polysilicon layer including a channel, a source electrode, and a drain electrode;
a gate insulating layer;
a gate electrode;
a passivation layer;
a data line, a source electrode metal structure, and a drain electrode metal structure on the passivation layer, the source electrode metal structure, the drain electrode metal structure;
an organic film layer;
the transparent common electrode;
the first insulating layer; and
the pixel electrode.

3. The pixel unit of claim 2, wherein
the first conductive layer is in the same layer with the gate electrode, and is connected with the transparent common electrode through a contact hole;
the second conductive layer is in the same layer with the drain electrode at the polysilicon layer, and is connected with the drain electrode; and
the second insulating layer is the gate insulating layer.

4. The pixel unit of claim 3, wherein
the first conductive layer and the gate electrode are formed in the same process step; and
the second conductive layer and the drain electrode at the polysilicon layer are formed in the same process step.

5. The pixel unit of claim 2, wherein
the first conductive layer is in the same layer with the gate electrode, and is connected with the transparent common electrode through a metal conductive pad;
the second conductive layer is in the same layer with the drain electrode at the polysilicon layer, and is connected with the drain electrode; and
the second insulating layer is the gate insulating layer.

6. The pixel unit of claim 5, wherein
the metal conductive pad, the data line, the source electrode metal structure, and the drain electrode metal structure are formed in the same layer and formed in the same process step, the metal conductive pad having one side connected with the first conductive layer through a first contact hole, and an opposite side connected with the transparent common electrode through a second contact hole.

7. The pixel unit of claim 2, wherein
the first conductive layer is in the same layer with the drain electrode metal structure, and is connected with the transparent common electrode through a contact hole;
the second conductive layer is in the same layer with the gate electrode, and is connected with the drain electrode metal structure through a contact hole; and
the second insulating layer is the passivation layer.

8. The pixel unit of claim 7, wherein
the first conductive layer and the drain electrode metal are formed in the same process step; and
the second conductive layer and the gate electrode are formed in the same process step.

9. The pixel unit of claim 1, further comprising:
a gate electrode on the substrate;
a gate insulating layer on the gate electrode;
a polysilicon layer on the gate insulating layer, the polysilicon layer including a channel, a source electrode and a drain electrode;
a passivation layer on the polysilicon layer;
a data line, a source electrode metal structure and a drain electrode metal structure on the passivation layer;
an organic film layer on the data line, the source electrode metal structure and on the drain electrode metal structure;
the transparent common electrode on the organic film layer;
the first insulating layer on the transparent common electrode; and
the pixel electrode on the first insulating layer.

10. The pixel unit of claim 9, wherein
the first conductive layer is in the same layer with the gate electrode, and is connected with the transparent common electrode through a contact hole;
the second conductive layer and the drain electrode are formed on a same second layer, the second conductive layer connected with the drain electrode; and
the second insulating layer is the gate insulating layer.

11. The pixel unit of claim 10, wherein
the first conductive layer and the gate electrode are formed in the same process step; and
the second conductive layer and the drain electrode are formed in the same process step.

12. The pixel unit of claim 9, wherein
the first conductive layer and the gate electrode are formed in a same layer, the first conductive layer connected with the transparent common electrode through a metal conductive pad;
the second conductive layer and the drain electrode are formed in a same layer, the second conductive layer connected with the drain electrode; and
the second insulating layer is the gate insulating layer.

13. A method for manufacturing an IPS type TFT-LCD array containing a plurality of pixel units, the method comprising:
providing a substrate including the TFT-LCD array, each of the pixel units having an area, wherein a pixel unit comprises:
a thin film transistor switch, a pixel electrode, a transparent common electrode, and a first insulating layer disposed between the transparent common electrode and the pixel electrode, so that a parallel electric field is formed between the pixel electrode and the transparent common electrode; wherein the transparent common electrode is located between the pixel electrode and a substrate;
a first storage capacitor being formed by the transparent common electrode, the pixel electrode, and the first insulating layer; and
a second storage capacitor being formed by a first conductive layer, a second conductive layer, and a second insulating layer disposed between the first conductive layer and the second conductive layer;
wherein the first conductive layer is electrically connected within the area of the pixel unit to the transparent common electrode and the second conductive layer is electrically connected within the area of the pixel unit to the potential of the transparent common electrode and that of the pixel electrode, so that a common electrode potential is provided to the first conductive layer or the second conductive layer by the transparent common electrode connected thereto; the first conductive layer and the transparent common electrode are formed in different layers, the second conductive layer and the pixel electrode are formed in different layers.

* * * * *